United States Patent Office 3,700,557
Patented Oct. 24, 1972

3,700,557
PROCESS FOR PRODUCING L-LYSINE
BY FERMENTATION
Kiyoshi Nakayama, Sagamihara-shi, Haruo Tanaka, Machida-shi, and Hiroshi Hagino, Hachioji-shi, Japan, assignors to Kyowa Hakko Kogyo Co., Ltd., Tokyo, Japan
No Drawing. Continuation of abandoned application Ser. No. 563,030, July 6, 1966. This application Aug. 6, 1968, Ser. No. 750,456
Claims priority, application Japan, Mar. 4, 1966, 41/15,376
Int. Cl. C12d *13/06*
U.S. Cl. 195—29                                              11 Claims

ABSTRACT OF THE DISCLOSURE

A process for producing L-lysine by fermentation. A microorganism which requires threonine, methionine, arginine, histidine, leucine, isolecucine, phenylalanine, cystine or cysteine and is capable of producing L-lysine is cultured in an aqueous nutrient medium containing a source of carbon and nitrogen under aerobic conditions. Microorganisms belonging to the genera Brevibacterium, Corynebacterium, Arthrobacter and Microbacterium are exemplified.

---

CROSS-REFERENCE TO RELATED APPLICATION

This application is a continuation of copending application Ser. No. 563,030, filed on July 6, 1966, which application is now abandoned.

This invention relates to a process for producing L-lysine. More particularly, it relates to a process for the production of L-lysine by fermentation. Even more particularly, the invention relates to a process for the production of L-lysine by fermentation with microorganisms having particular nutrition requirements.

L-lysine, 2,6-diaminohexanoic acid, is an essential amino acid well known in the art. It has been used in the area of food enrichment, whereby the supplementation of wheat-based foods with lysine improves their protein quality and results in an improved growth and tissue synthesis. This compound has also been used medically as a nutrient. Thus, it would be most advantageous to have available a process for the production thereof which may be carried out economically on an industrial scale with inexpensive starting materials.

One of the objects of the present invention is to provide an improved process for the production of L-lysine which overcomes some of the disadvantages and deficiencies of the prior art methods.

Another object of the present invention is to provide a process for producing L-lysine by fermentation which may be carried out in an efficacious and simple manner.

A further object of the invention is to provide a process for producing L-lysine by fermentation which gives the product in high purity and good yields.

A still further object of the invention is to provide a process for producing L-lysine by fermentation which may be carried out advantageously on an industrial scale at low cost from inexpensive starting materials to give a high yield of product.

These and other objects and advantages of the present invention will become apparent to those skilled in the art from a consideration of the following specification and claims.

In accordance with the present invention, it has been found that remarkably large quantities of L-lysine are produced in the fermentation liquor if fermentation or culturing is carried out with strains of bacteria belonging to the genera Brevibacterium, Corynebacterium, Arthrobacter and Microbacterium having particular nutrition requirements. In particular, strains which require threonine, methionine, arginine, histidine, leucine, isoleucine, phenylalanine, cystine or cysteine for their growth have been found to be especially advantageous in the process of the present invention. In addition, appropriate strains which have complex nutritional requirements wherein they require more than one of the amino acids enumerated herein for their growth may also be employed in the present invention.

Strains having the foregoing noted nutrition requirements can be obtained by a mutation treatment of parent strains which do not have such a nutritional requiremnt by means of radiation exposure, chemical agents and the like. For example, mutant strains having the above-mentioned nutritional requirements can be obtained by irradiating *Brevibacterium ammoniagenes, Corynebacterium rathayi, Arthrobacter globiformis* or *Microbacterium flavum* with ultraviolet radiation.

It is possible to some extent to understand that strains which require threonine, methionine or isoleucine for their growth may accumulate L-lysine in a fermentation medium, when the mutual relationships in the biosynthesis of lysine, threonine, methionine, isoleucine and leucine with *Escherichia coli* and other microorganisms are taken into account. However, the mechanism of such an accumulation has not been evident. And, the mechanism by which large amounts of L-lysine are accumulated by strains which require arginine, histidine, cystine or cysteine for their growth is not clear at all and is quite surprising and unexpected. However, the present inventors have noted that strains having the above-mentioned nutritional requirements generally accumulate L-lysine despite differences among the particular genera employed. Therefore, it is believed that there is a close relationship between the nutrition requirement and the capability of the particular strain to accumulate L-lysine.

As for the composition of the culture medium, either a synthetic or a natural organic culture medium may be employed for the growth and fermentation of the microorganisms as long as it contains the essential nutrients for the growth of the particular microorganism employed. Such nutrients include a carbon source, a nitrogen source, inorganic substances and the like in appropriate amounts.

As the carbon source, various carbohydrates such as glucose, glycerol, fructose, sucrose, maltose, mannose, mannitol, xylose, galactose, starch, starch hydrolysate solution, molasses and the like may be used in the culture medium. The concentration thereof usually ranges from 2 to 15% by weight (reduced as glucose) in the culture medium. Various organic acids such as aspartic acid, malic acid, fumaric acids, lactic acid, succinic acid, acetic acid, pyruvic acid, oxalacetic acid, gluconic acid, α-ketoglutaric acid and the like may also be employed.

As for the nitrogen source, various inorganic and organic salts and compounds may be employed such as ammonia and ammonium salts, for example, ammonium chloride, ammonium sulfate, ammonium nitrate, ammonium carbonate, ammonium phosphate, ammonium acetate and the like, urea, natural proteolytic organic substances such as peptone, casein hydrolysates, meat extract, yeast extract, cornsteep liquor, N-Z-Amine (a trademark for a series of casein hydrolysates), fish meal or the digested product thereof, defatted soybean dregs, or the digested product thereof or the hydrolysate thereof and the like as well as the non-proteolytic organic substances such as aspartic acid, glutamic acid, threonine, methionine, etc. It is desirable to use at least one of the above-mentioned proteolytic organic substances together with a synthetic nitrogen-containing compound such as urea, ammonium salts and the like.

As inorganic substances, potassium dihydrogen phosphate, dipotassium hydrogen phosphate, magnesium sulfate, sodium chloride, ferrous sulfate, manganese sulfate, calcium carbonate and the like may be used.

The microorganisms employed in the process of the present invention require the nutrients mentioned hereinabove for their growth. Therefore, the particular nutrient required should be added to the culture medium in appropriate amounts. However, they are usually contained in the foregoing protein organic substances as nitrogen sources. Accordingly, such substances are generally sufficient to provide an appropriate amount of such nutrients. However, the above-mentioned protein organic substances are not always necessarily used in the particular culture medium employed, and it may well be necessary to add the particular nutrient amino acid required or a substance containing the same to the culture medium.

The fermentation is carried out under aerobic conditions, such as aerobic shaking of the culture or with stirring of a submerged culture with the introduction of air thereinto, at a temperature of from about 24° to 37° C. The proper adjustment of the pH of the culture medium is extremely important during culturing in the fermentation process of the present invention. The pH of the culture medium shows a tendency to go below 7.0 as the fermentation proceeds, hence, it is necessary to adjust the pH of the culture medium to within a range of 5.1 to 8.5 with proper neutralizing agents during culturing in order to obtain a high yield of L-lysine. Neutralizing agents which may be used for this purpose include ammonia, caustic alkalis such as sodium hydroxide, potassium hydroxide and the like, ammonium carbonate, calcium carbonate, calcium hydroxide, etc.

Culturing is generally carried out for from 2 to 5 days, whereby large amounts of L-lysine are accumulated in the fermentation liquor. The L-lysine is recovered from the culture liquor by removing the cell bodies and employing an ion exchange resin treatment as described in Example I after the completion of culturing or by other methods of ion exchange resin treatment conventionally used in the art, by treatment with picric acid, by treatment with benzenesulfonic acid, and the like.

The following examples are given merely as illustrative of the present invention and are not to be considered as limiting. Unless otherwise indicated, the percentages set forth therein are by weight.

EXAMPLE I

*Brevibacterium ammoniagenes* No. 4948 ATCC 19350 (threonine-requiring strain) is employed as the seed bacterium. This strain is inoculated into a 250 ml. conical flask containing 30 ml. of a seed medium consisting of 2% of glucose, 1% of peptone, 1% of yeast extract and 0.2% of sodium chloride and incubated at 30° C. for 24 hours. The seed bacterium thus obtained is inoculated in a ratio of 10% by volume into a 250 ml. conical flask containing 30 ml. of the following fermentation medium:

7.5% glucose
1.5% ammonium sulfate
0.05% $K_2HPO_4$
0.05% $KH_2PO_4$
0.025% $MgSO_4 \cdot 7H_2O$
0.5% N-Z-amine
30 μg./l. biotin
2% $CaCO_3$ The pH of the fermentation medium is 7.0

Aerobic shaking of the culture is carried out at 30° C. for four days. As a result, 7.2 mg./ml. of L-lysine is found to be accumulated in the culture liquor.

Two liters of the filtrate obtained by removing the cell bodies from the fermentation liquor is passed through a weakly basic ion exchange resin (Amberlite IRC-50) which has been previously adjusted to a pH of 7.0 with 0.5 M buffer solution. The resin column is washed with water and eluted with 0.15 N ammonia water. The graduations containing L-lysine are gathered together and concentrated. Subsequently, the concentrated solution is adjusted to the acid side (pH of 4.0) and further concentrated. Consequently, 10.5 grams of crude crystals of L-lysine-1-hydrochloride is obtained.

EXAMPLE II

Culturing is carried out in the same manner and under the same conditions as described in Example I except that the fermentation medium contains 7.5% of fructose and 0.5% of meat extract instead of the glucose and N-Z-Amine of Example I. As a result, 6.1 mg./ml. of L-lysine is produced in the culture liquor.

EXAMPLE III

Culturing is carried out as described in Example I except that large-sized test tubes containing 10 ml. of the fermentation medium, respectively, are used in the fermentation. The amounts of L-lysine accumulated in the culture medium by the use of various strains of *Brevibacterium ammoniagenes* are shown in the table.

TABLE

| Strain employed: | Amount of L-lysine accumulated (mg./ml.) |
|---|---|
| *Brevibacterium ammoniagenes* No. 4948 ATCC 19350 (threonine-requiring strain) | 6.5 |
| *Brevibacterium ammoniagenes* No. 5118 ATCC 19351 (phenylalanine-requiring strain) | 4.2 |
| *Brevibacterium ammoniagenes* No. 5130 ATCC 19352 (histidine-requiring strain) | 3.1 |
| *Brevibacterium ammoniagenes* No. 5366 ATCC 19353 (methionine-requiring strain) | 4.3 |
| *Brevibacterium ammoniagenes* No. 5313 ATCC 19354 cysteine-requiring strain) | 2.1 |
| *Brevibacterium ammoniagenes* No. 5328 ATCC 19355 (leucine-requiring strain) | 2.1 |
| *Brevibacterium ammoniagenes* No. 5134 ATCC 19356 (isoleucine-requiring strain) | 1.5 |

EXAMPLE IV

The same culturing procedure as described in Example I is carried out but with the threonine, methionine, arginine, histidine, leucine, isoleucine, phenylalanine, cystine or cysteine requiring strains of *Corynebacterium rathayi*, *Arthrobacter globiformis*, and *Microbacterium flavum* as the microorganism. Amounts of L-lysine ranging from 1 to 10 mg./ml. are accumulated in the culture liquor in each case.

The invention being thus described, it will be obvious that the same may be varied in many ways. Such variations are not to be regarded as a departure from the spirit and scope of the invention and all such modifications as would be obvious to one skilled in the art are intended to be included herein.

What is claimed is:

1. A process for producing L-lysine which comprises culturing a threonine-, methionine-, histidine-, leucine-, isoleucine-, phenylalanine- or cysteine-requiring strain of a microorganism belonging to *Brevibacterium ammoniagenes* in an aqueous nutrient medium containing a source of carbon and nitrogen under aerobic conditions at a pH of from about 5.1 to 8.5, and accumulating L-lysine in the resultant culture liquor.

2. The process of claim 1, wherein said culturing is carried out at a temperature of from about 240 to 37° C.

3. The process of claim 1, wherein said source of carbon is a carbohydrate.

4. The process of claim 1, wherein the L-lysine is recovered from the fermentation liquor by an ion exchange resin treatment.

5. The process of claim 1, wherein said microorganism is *Brevibacterium ammoniagenes* ATCC 19350.

6. The process of claim 1, wherein said microorganism is *Brevibacterium ammoniagenes* ATCC 19351.

7. The process of claim 1, wherein said microorganism is *Brevibacterium ammoniagenes* ATCC 19352.

8. The process of claim 1, wherein said microorganism is *Brevibacterium ammoniagenes* ATCC 19353.

9. The process of claim 1, wherein said microorganism is *Brevibacterium ammoniagenes* ATCC 19354.

10. The process of claim 1, wherein said microorganism is *Brevibacterium ammoniagenes* ATCC 19355.

11. The process of claim 1 wherein said microorganism is *Brevibacterium ammoniagenes* ATCC 19356.

References Cited

UNITED STATES PATENTS 2,979,439  4/1961  Kinoshita et al. _____ 195—47

LIONEL M. SHAPIRO, Primary Examiner

U.S. Cl. X.R.

195—47

UNITED STATES PATENT OFFICE
CERTIFICATE OF CORRECTION

Patent No. 3,700,557      Dated October 24, 1972

Inventor(s) Kiyoshi NAKAYAMA, Haruo TANAKA and Hiroshi HAGINO

It is certified that error appears in the above-identified patent and that said Letters Patent are hereby corrected as shown below:

In Column 1, line 11, "Claims priority, application Japan, Mar. 4, 1966" should read --Claims priority, application Japan, Mar. 14, 1966--

Signed and sealed this 29th day of May 1973.

(SEAL)
Attest:

EDWARD M. FLETCHER, JR.
Attesting Officer

ROBERT GOTTSCHALK
Commissioner of Patents